United States Patent [19]

Edl

[11] Patent Number: 4,643,282

[45] Date of Patent: Feb. 17, 1987

[54] MOTOR HAVING AN ELECTROMAGNETICALLY ACTUATED FRICTION CLUTCH AND FRICTION BRAKE

[75] Inventor: Josef Edl, Griesheim, Fed. Rep. of Germany

[73] Assignee: Quick-Rotan Elektromotoren GmbH, Darmstadt, Fed. Rep. of Germany

[21] Appl. No.: 616,298

[22] Filed: Jun. 1, 1984

[30] Foreign Application Priority Data

Jun. 1, 1983 [DE] Fed. Rep. of Germany .... 8316122[U]

[51] Int. Cl.[4] ............................................. F16D 67/06
[52] U.S. Cl. .............................. 192/18 B; 192/84 AB; 192/111 B; 192/113 A; 310/76
[58] Field of Search ............. 192/18 B, 84 A, 84 AA, 192/12 D, 84 AB, 110 R, 111 B, 113 A; 310/76

[56] References Cited

U.S. PATENT DOCUMENTS

| | | | |
|---|---|---|---|
| 2,771,973 | 11/1956 | Fuge | 192/110 R X |
| 3,162,285 | 12/1964 | Sala | 192/84 A |
| 3,485,330 | 12/1969 | Reiff | 192/84 AA |
| 3,581,855 | 6/1971 | Taeffner et al. | 192/18 B |
| 3,624,767 | 11/1971 | Kroeger | 192/18 B |
| 3,750,781 | 8/1973 | Lengsfeld | 192/18 B |
| 3,885,175 | 5/1975 | Palloch | 192/18 B X |
| 3,945,476 | 3/1976 | de Jong | 192/18 B X |
| 4,135,612 | 1/1979 | Lengsfeld | 192/18 B |
| 4,172,985 | 10/1979 | Meier | 192/18 B X |
| 4,556,132 | 12/1985 | Lengsfeld et al. | 192/110 R X |

FOREIGN PATENT DOCUMENTS

| | | |
|---|---|---|
| 45591 | 2/1982 | European Pat. Off. . |
| 1763696 | 1/1972 | Fed. Rep. of Germany . |
| 2149419 | 4/1973 | Fed. Rep. of Germany ... 192/84 A |
| 2263259 | 7/1974 | Fed. Rep. of Germany . |
| 2649252 | 5/1978 | Fed. Rep. of Germany . |
| 2934396 | 3/1981 | Fed. Rep. of Germany . |

Primary Examiner—Rodney H. Bonck
Assistant Examiner—Richard M. Lorence
Attorney, Agent, or Firm—Antonelli, Terry & Wands

[57] ABSTRACT

A motor including an electromagnetically actuated friction clutch and friction brake for respectively transferring a driving torque and/or a braking torque to an output shaft. A rigid hub is rotationally fixed on an output shaft of the motor for rotation therewith. A first axially deflectable spring washer is connected to an annular shaped clutch disk, with a second axially deflectable spring washer being connected to a brake disk. The clutch disk and brake disk are axially movable by a magnetic force and are adapted to be pressed against a driving pulley and a braking block respectively. The hub is fashioned as a one piece member and a supporting ring is disposed axially between the clutch disk and the brake disk. The axially deflectable spring washers are prestressed in a rest position and, at points that are essentially the same radial distance from the axis of the hub but staggered with respect to one another in the direction of rotation of the motor, are connected with the supporting ring and the clutch disk or brake disk. The output shaft is adjustable in an axial direction for the purposes of enabling an adjustment of a brake slack and/or a play in the clutch.

10 Claims, 1 Drawing Figure

U.S. Patent  Feb. 17, 1987  4,643,282
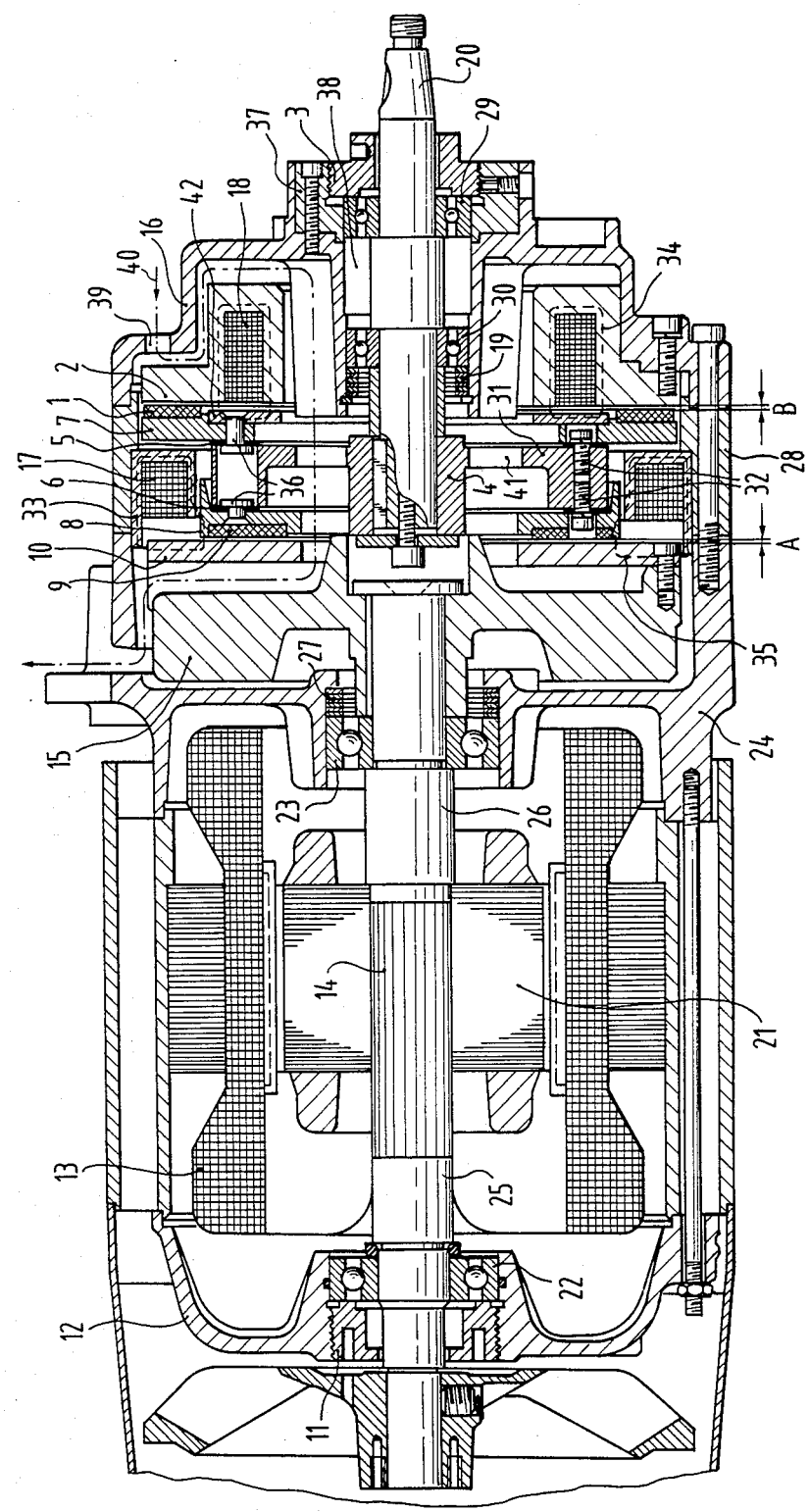

MOTOR HAVING AN ELECTROMAGNETICALLY ACTUATED FRICTION CLUTCH AND FRICTION BRAKE

The present invention relates to a motor and, more particularly, to a motor having an electromagnetically actuated friction clutch and friction brake for transferring a driving torque and/or a braking torque to an output shaft, which output shaft has a rigid hub fixedly attached thereto for rotation therewith, and which hub, through a pair of axially deflectable spring washers is connected to an annular or ring-shaped clutch disk or disk brake, which disks are axially adjustable by a magnetic force adapted to be pressed against a driving pulley or a braking lock disposed on the motor shaft.

In, for example, Auslegeschrift No. 22 63 259, a motor is proposed wherein the hub is subdivided into two parts that are connected with an output shaft independently from one another, with the two parts of the hub being coaxially encircled or surrounded by a clutch disk or brake disk. An edge of the spring washers, disposed radially inside, is connected to one of the two parts of the hub; whereas, the clutch or brake disk is mounted at the radially outer part of the spring washers. Adjusting screws, radially threadably inserted into the hub parts, are employed for a mutual connection of the output shaft and the parts of the hub, with the adjusting screws pressing against an outer surface of the output shaft. In order to enable an adjustment of a slack of the brake or a play of the clutch, the output shaft must be moved, in order to permit access to the adjusting screws of the parts of the hub, and, after an unfastening of the screws, be able to axially slide the parts of the hub with respect to the output shaft.

A disadvantage of the above proposed motor construction resides in the fact that the adjustment of the brake slack or clutch play can only be determined after the output shaft, together with the clutch disk and brake disc is reinstalled. Consequently, a removal, adjustment, and a reinstallation may have to be repeated several times until the clutch play and brake slack have been set at a predetermined desired value.

A further disadvantage of the above proposed motor resides in the fact that when the clutch and brake are not energized, the spring washers are ineffective; therefore there is no defined starting position of the clutch disc and the brake disc. Consequently, an adjustment of the correct brake slack and clutch play is considerably more difficult.

The aim underlying the present invention essentially resides in providing a motor having an electromagnetically actuated friction clutch and friction brake which permits an exact adjustment of the brake slack and/or clutch play in an extremely easy manner.

In accordance with advantageous features of the present invention, the motor is provided with a hub formed of one piece and includes a supporting ring disposed axially between the clutch disk and the brake disk, with the spring washers, at points which are essentially at the same radial distance from an axis of the hub but staggered with respect to one another in a direction of rotation of the motor, being connected with the support ring and the clutch disk or the brake disk and being provided with a prestress at a rest position so as to enable an adjustment of the brake slack and/or the clutch play whereby the output shaft can be adjusted in an axial direction.

In accordance with the present invention, the prestressed spring washers, in cooperation with a supporting ring of the hub, provide for the brake disk and clutch disk to take up a defined starting position as long as the associated magnets, i.e., the brake magnet or clutch magnet, are not energized. By virtue of the provision of a predetermined starting position, the brake slack and/or the clutch play can then be easily and precisely adjusted by an axial adjustment of the output shaft.

Advantageously, in accordance with further features of the present invention, the supporting ring and clutch disk have almost the same outside diameter. Moreover, an outside diameter of a driving pulley and the brake disk is larger than an outside diameter of the supporting ring and the clutch disk, with a ring or annular shaped space being laterally limited by the driving pulley and the brake disk and being radially limited to the inside by the clutch disk and supporting ring, with the clutch magnet being accommodated or housed in the ring or annular shaped space.

By virtue of the above noted features of the present invention, it is possible to realize an extremely efficient utilization of the working space in the axial as well as the radial directions.

Preferably, the braking magnet of the motor is disposed on a side of the brake disk that faces away from the support ring thereby also improving the overall dimensional configurations of the motor.

In order to provide an effective cooling of the clutch and brake arrangement, in accordance with the present invention, the brake disk, the hub, the clutch disk, and the driving pulley are provided with openings for enabling a passage and flow of a cooling air.

In order to permit a simple adjustment of an axial position of the output shaft and, consequently, the hub, from the outside of the motor, advantageously, an easily accessible threaded ring is provided that is adapted to be threaded into a part attached to a housing of the clutch motor, with the threaded ring for adjusting the output shaft in one axial direction, resting against a collar of the output shaft or against a bearing of the output shaft that is axially adjustable together with the output shaft. Preferably, means are provided for flexibly prestressing the output shaft in the other axial direction.

In order to enable an axial adjustment of the motor shaft and the driving pulley connected therewith which is independent of the adjustment of the output shaft in a simple and convenient manner, an easily accessible further threaded ring is provided that is adapted to be threaded into a part attached to the housing of the clutch motor, with the further threaded ring for adjusting the motor shaft in one axial direction resting against a collar of the motor shaft or against a bearing of the motor shaft that is axially adjustable together with the motor shaft. Advantageously, means are provided for flexibly prestressing the motor shaft in the other axial direction.

Accordingly, it is an object of the present invention to provide a motor having an electromagnetically actuated friction clutch and friction brake which avoids, by simple means, shortcomings and disadvantages encountered in the prior art.

Another object of the present invention resides in providing a motor having an electromagnetically actuated friction clutch and friction brake wherein a working cycle of the clutch and brake can be adjusted precisely without the use of measuring means such as distance gauges or similar devices.

Yet a further object of the present invention resides in providing a motor having an electromagnetically actuated friction clutch and friction brake wherein work tolerances and a wearing of friction linings can be readily compensated for in a simple manner.

A still further object of the present invention resides in providing a motor having an electromagnetically actuated friction clutch and friction brake which is especially suitable for position drives in machine constructions as well as, for example, in textile and sewing machine drives.

A still further object of the present invention resides in providing a motor having electromagnetically actuated friction clutch and friction brake which is simple in construction and therefore relatively inexpensive to manufacture.

Yet another object of the present invention resides in providing a motor having an electromagnetically actuated friction clutch and friction brake which functions realiably under all operating conditions.

These and other objects, features, and advantages of the present invention will become more apparent from the following description when taken in connection with the accompanying drawing which shows, for the purposes of illustration only, one embodiment in accordance with the present invention.

The single FIGURE of the drawing is a longitudinal cross sectional view of a motor having an electromagnetically actuated friction clutch and friction brake constructed in accordance with the present invention.

Referring now to the single FIGURE of the drawing, according to this FIGURE, a driving motor 13 includes a rotor 21 disposed on a motor drive shaft 14, with the shaft 14 having mounted thereon a disk flywheel 15 connected to a driving pulley or plate 10 by suitable fastening means such as, for example, bolts or screws. A front surface of the disk flywheel, facing the driving pulley 10, is constructed as a radial fan, with the shaft 14 being disposed in bearings 22, 23 located in bearing brackets 12, 24, and with an inner raceway of the bearings 22, 23 being respectively supported against collars or shoulders 25, 26 of the shaft 14.

A threaded adjustment ring 11, concentric with respect to the shaft 14, is threadably inserted into the bearing bracket 12, with the ring 11 laterally resting against the bearing 22. By rotating the ring 11 in one direction, the motor shaft 14, together with the flywheel 15 and the driving pulley 10, can be axially displaced to the right so as to enable an adjusting movement to be effected against a force of a spring assembly 27 which is fixedly disposed concentrically with respect to the shaft 14 in the bearing bracket 24 and which rests against a side of the bearing 23. When the ring 11 is adjusted in the other rotating direction, the spring assembly 27, through the bearings 23 and collar 26, urges or pushes the motor shaft 14 to the left.

A housing ring 28 and a bearing bracket 16 together with a bearing bracket 24 are secured to each other by suitable fastening means such as, for example, bolts or screws, with an output shaft 20 of the motor 13, aligned with respect to the axis of the shaft 14, being rotatably supported by bearings 29, 30 disposed in the bearing bracket 16. A hub 4 is wedged or force fitted on the output shaft 20, with the hub 4 including a supporting ring 31 disposed concentrically to the axis of the output shaft 20. Spring washers 5, 6 are disposed on respective sides of the supporting ring 31, with the spring washers 5, 6 being connected by fastening means 32 such as, for example, bolts or screws, with the supporting ring 31. The fastening means 32 are inserted into joint tapped holes of the supporting ring 31 from opposite sides thereof.

The spring washers 5, 6 are respectively firmly connected with a brake disk 7 and a clutch disk 8 by, for example, rivets 36. An anchoring ring 42 is firmly mounted or connected to a front side of the brake disk 7 by, for example, rivets 36, with the anchoring ring 42 being preferably fashioned of a light metal material such as, for example, aluminum. The brake disk 7 and the clutch disk 8 are disposed on opposite sides of the hub 4 and are of a ring or annular shape, with a brake friction lining 1 and a clutch friction lining 9 being respectively disposed on a side of the brake disk 7 and the clutch disk 8 facing away from the hub 4. The clutch friction lining 9 is adapted to interact or engage with the driving pulley 10, while the brake friction lining 1 is adapted to be pressed against a braking magnetic part 2 forming a braking block. The braking magnetic part 2 is connected by, for example, threaded fasteners such as screws or the like, to the bearing bracket 16.

A brake coil 18 is accommodated in the braking magnetic part 2 on a side of the brake disk 7 facing away from the brake disk 7. A clutch coil 17 is arranged in a magnetic clutch part 33 inserted into the housing ring 28. The radially outside legs of the housing ring 28 extend coaxially around the driving pulley 10. The anchoring ring 42, disposed axially opposite the brake coil 18, the clutch disk 8, the driving pulley 10, as well as the magnetic parts 2, 32 are fashioned of a low retentivity material. Spring washers 5, 6, in a rest condition, are under a prestress so as to enable the brake disk 7 and clutch disk 8 to be pulled against the supporting ring 31 when the brake and clutch are de-energized or without current. When the brake coil 18 is energized, a braking magnetic flux 34 is developed which, against the pull back force of the spring washer 5, moves the brake disc 7 axially in a direction toward the braking magnetic part 2. However, if the clutch coil 17 is energized, a magnetic clutch flux 35 is created which, against the pull back force of the spring washer 6, adjusts the clutch disk 8 in an axial direction of the driving pulley 10.

The supporting ring 31 and clutch disk 8 have substantially the same diameter, while an outside of the diameter of the driving pulley 10 is substantially equal to an outside diameter of a brake disk 7 and larger than the outside diameter of the clutch disk 8. The clutch magnet formed by the clutch coil 17 and the magnetic clutch part 33 is disposed in a substantially ring or annular shaped space which is laterally limited by the driving pulley 10 and the brake disk 7, and radially on the inside, by the clutch disk 8 and the supporting ring 31. The fastening means 32 and rivets 36 are disposed substantially at a same radial distance from an axis of the hub 4; however, the fastening means 32 and rivets 36 are staggered with respect to one another in a direction of rotation of the motor 13. While only one pair of fastening means 32 and one pair of rivets are shown in the FIGURE, it is understood that several may be provided. For example, the spring washers 5, 6 may be connected with the supporting ring 31 of the hub 4 at three points that, in a circumferential direction, are staggered from one another by 120°, while three mounting or connecting points may be provided between the spring washers 5, 6 and the brake disk 7 or clutch disk 8 that are also located at a mutual angular distance of 120° with respect to one another, which, with respect to the mounting points between the spring washers 5, 6 and the hub 4 are, in each case, at a 60° angle with respect to one another.

A threaded ring 3 is threadably inserted into a receiving part 37 of the bearing bracket 16, with the ring 3 resting against a side surface of the bearing 29. By rotating the ring 3 in one direction, the output shaft 20 is shifted to the left against the force of a spring assembly 19 acting against the bearing 30 and a collar 38 of the output shaft 20 to flexibly prestress the output shaft 20. However, when the ring 3 is rotated in the other direction, an axial shifting of the output shaft 20 to the right takes place through the bearing 30 and the collar 38 by the spring force of the spring assembly 19.

The bearing bracket 16 is provided with ventilation openings 39 which enable a cooling air 40 to enter therethrough and flow along a front side of the magnetic brake part 2 that is disposed to the right of the single FIGURE, then flow in an essentially axial direction so as to pass through inside openings of the magnetic brake part 2 and the brake disk 7, through cooling-air openings 41 of the hub 4 as well as inside recesses of the clutch disk 8 and the dirving pulley 10 in order to then be driven radially outwardly of the motor 13 by the radial fan formed between the driving pulley 10 and the flywheel 15.

During operation, the motor shaft 14, flywheel 15 and driving pulley 10 constantly rotate. As long as the clutch coil 17 and the brake coil 18 are without current or de-energized, the clutch disk 8 and the brake disk 7, under the influence of the flexible prestressing of the spring washers 6, 5 are held in a defined starting position in which an axial air gap or play A exists between the front side of the driving pulley 10 and the clutch friction line 9, and an axial air gap or play B exists between the front side of the magnetic braking part 2 and the brake friction lining 1 whereby the output shaft 20 is at rest.

When the clutch coil 17 is energized, the magnetic field of the clutch will close so that the clutch friction lining 9 and the clutch disk 8 are brought into contact with the rotating driving pulley 10 whereby the rotating movement, through the spring washer 6, is transferred to the hub 4 and the output shaft 20. When the clutch coil 17 is de-energized, the clutch disk 8, through the spring washer, is returned to its starting position. By energizing the brake coil 18, the magnetic field of the brake is closed and the brake disk 7, with the brake friction lining 1, is pressed against the standing magnetic braking part 2 and a braking torque, through the spring washer 5, is transferred to the hub 4 whereby the shaft 20 is braked.

For an adjustment of the brake slack or air gap B, the ring 3, accessible from outside of the motor 13, is adjusted so as to result in an axial shifting of the output shaft 20, together with the hub 4 and the brake disk 7. The brake lining 1 will rest against the magnetic braking part 2 when the shaft 20 can no longer be manually be turned. Starting from this adjustment, a precise adjustment of the air gap or brake slack B can take place due to the fact that the ring 3 can be rotated by a predetermined angle in the opposite direction.

The air gap or clutch play A may be adjusted by rotation of the ring 11 whereby the motor shaft 14, flywheel 15, and driving pulley 10 are shifted in the axial direction. The clutch play A is zero when, during a rotation of the shaft 20, the rotor 21 of the driving motor 13 is taken along. Based on that, the clutch play A may be precisely adjusted by rotating the ring 11 in the opposite direction of rotation by a predetermined angle.

In the above described arrangement, the clutch disk 8 and the brake disk 7, in a un-energized condition of the clutch magnet and braking magnet, through the pre-stressing of the respective spring washers 5, 6 are always reliably returned to the predetermined initial position so that a dragging of the clutch or friction lining is impossible.

While I have shown and described only one embodiment in accordance with the present invention, it is understood that the same is not limited thereto but is susceptible of numerous changes and modifications as known to one having ordinary skill in the art and I therefore do not wish to be limited to the details shown and described herein, but intend to cover all such modifications as are encompassed by the scope of the appended claims.

I claim:

1. A motor comprising an output shaft means, a friction clutch means for transferring a driving torque and a friction brake means for applying a brake torque to the output shaft means, the friction clutch means including a ring-shaped clutch disk means, the friction brake means including a ring-shaped friction disk means, a rigid hub means mounted on the shaft means for rotation therewith, a supporting ring means attached to said hub and disposed between and axially spaced from the clutch disk means and the brake disk means, a first prestressed axially deflectable spring washer means disposed on one side of the supporting ring means for normally urging the clutch disk means in a direction toward the supporting ring means, a second prestressed axially deflectable spring washer means disposed on an opposite side of the supporting ring means for normally urging the brake disk means in a direction of the supporting ring means, electromagnetic means for selectively actuating the clutch disk means and brake disk means so as to alternatively press the clutch disk means against a driving plate and the brake disk against a braking means, means for connecting said first prestressed axially deflectable spring means to the supporting ring means, means for connecting said first prestressed axially deflectable spring means to said clutch disk means, means for connecting said second prestressed axially deflectable spring means to the supporting ring means, means for connecting said second prestressed axially deflectable spring means to said brake disk means, said connecting means for said first and second prestressed axially deflectable spring means being disposed at substantially a same radial distance from a center axis of the hub means but staggered with respect to one another in a direction of rotation of the motor, means for enabling an axial adjustment of the output shaft means so as to permit an adjustment of a play in the brake means and the clutch means including a threaded ring means accessible from an outside of the motor, said threaded ring means being adapted to be adjustably threadably inserted into a member attached to a housing of the motor, said threaded ring means being displaceable in an axial direction against a side surface of a bearing means of the output shaft means so as to enable an axial adjustment of the output shaft means, and wherein means are provided for enabling an adjustment of the driving plate and a motor shaft means of the motor in an axial direction including a further threaded ring means accessible from outside of said motor, said further threaded ring means being threadably insertable into a member attached to the housing, said further threaded ring means being adapted to rest against a further bearing means of the motor shaft means so as to enable an axial adjustment of the further bearing means of the motor shaft means.

2. A motor according to claim 1, wherein said hub means is of a one piece construction.

3. A motor according to claim 1, wherein said supporting ring means has an outer diameter substantially equal to an outer diameter of said clutch disk means.

4. A motor according to claim 3, wherein an outer diameter of the driving plate and the brake disk means is larger than the outer diameter of said supporting ring means and said clutch disk means, said electromagnetic means includes a magnetic coil means accommodated in a ring-shaped space laterally limited by the driving plate and the brake disk means and radially limited by the clutch disk means and the supporting ring means.

5. A motor according to claim 4, wherein said electromagnetic means further includes a further magnetic coil means disposed on a side of the brake disk means facing away from the supporting ring means.

6. A motor according to claim 4, wherein means are provided for enabling a passage of cooling air through the brake disk means, hub means, clutch disk means, and driving plate.

7. A motor according to claim 1, wherein means are provided for enabling a passage of cooling air through the brake disk means, hub means, clutch disk means, and driving plate.

8. A motor according to claim 1, wherein an outer diameter of the driving plate and the brake disk means is larger than the outer diameter of said supporting ring means and said clutch disk means, said electromagnetic means includes a magnetic coil means accommodated in a ring-shaped space laterally limited by the driving plate and the brake disk means and radially limited by the clutch disk means and the supporting ring means.

9. A motor according to claim 8, wherein said electromagnetic means further includes a further magnetic coil means disposed on a side of the brake disk means facing away from the supporting ring means.

10. A motor comprising an output shaft means, a friction clutch means for transferring a driving torque and a friction brake means for applying a brake torque to the output shaft means, the friction clutch means including a ring-shaped clutch disk means, the friction brake means including a ring-shaped friction disk means, a rigid hub means mounted on the shaft means for rotation therewith, a supporting ring means attached to said hub and disposed between and axially spaced from the clutch disk means and the brake disk means, a first prestressed axially deflectable spring washer means disposed on one side of the supporting ring means for normally urging the clutch disk means in a direction toward the supporting ring means, a second prestressed axially deflectable spring washer means disposed on an opposite side of the supporting ring means for normally urging the brake disk means in a direction of the supporting ring means, electromagnetic means for selectively actuating the clutch disk means and brake disk means so as to alternatively press the clutch disk means against a driving plate and the brake disk against a braking means, means for connecting said first prestressed axially deflectable spring means to the supporting ring means, means for connecting said first prestressed axially deflectable spring means to said clutch disk means, means for connecting said second prestressed axially deflectable spring means to the supporting ring means, means for connecting said second prestressed axially deflectable spring means to said brake disk means, said connecting means for said first and second prestressed axially deflectable spring means being disposed at substantially a same radial distance from a center axis of the hub means but staggered with respect to one another in a direction of rotation of the motor, means for enabling an axial adjustment of the output shaft means so as to permit an adjustment of a play in the brake means and the clutch means including a threaded ring means accessible from an outside of the motor, said threaded ring means being adapted to be adjustably threadably inserted into a member attached to a housing of the motor, said threaded ring means being displaceable in an axial direction against a side surface of a bearing means of the output shaft means so as to enable an axial adjustment of the output shaft means, and wherein means are provided for flexibly prestressing the output shaft means in one axial direction.

* * * * *